(12) United States Patent  
Krasnoiarov et al.

(10) Patent No.: US 8,079,075 B2
(45) Date of Patent: Dec. 13, 2011

(54) ACTIVE REVERSE PROXY SYSTEM

(75) Inventors: Boris Krasnoiarov, El Cerrito, CA (US); James Mace, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1056 days.

(21) Appl. No.: 11/467,251

(22) Filed: Aug. 25, 2006

(65) Prior Publication Data

US 2008/0072306 A1  Mar. 20, 2008

(51) Int. Cl.
*G06F 15/16* (2006.01)
(52) U.S. Cl. .......................... 726/12; 726/13
(58) Field of Classification Search ............ 380/255, 380/256, 257, 287, 59; 709/219, 220, 212, 709/213; 726/3, 12, 13, 14, 22, 26; 707/203, 707/204, 794
See application file for complete search history.

(56) References Cited

U.S. PATENT DOCUMENTS

| | | | |
|---|---|---|---|
| 2005/0091341 A1* | 4/2005 | Knight et al. | 709/218 |
| 2006/0031442 A1* | 2/2006 | Ashley et al. | 709/223 |
| 2006/0041637 A1* | 2/2006 | Jerrard-Dunne | 709/219 |
| 2007/0055930 A1* | 3/2007 | Jerrard-Dunne et al. | 715/523 |
| 2007/0094711 A1* | 4/2007 | Corley et al. | 726/3 |
| 2009/0083369 A1* | 3/2009 | Marmor | 709/203 |

* cited by examiner

*Primary Examiner* — Vivek Srivastava
*Assistant Examiner* — Nega Woldemariam
(74) *Attorney, Agent, or Firm* — Filpatrick Townsend & Stockton LLP

(57) ABSTRACT

A computer implemented method can include receiving a request from a user on an untrusted domain and forwarding the request to an application on a trusted domain. A response can be received from the application and modified based on rules. The modified response can then be provided to the user.

21 Claims, 1 Drawing Sheet

ACTIVE REVERSE PROXY SYSTEM

COPYRIGHT NOTICE

A portion of the disclosure of his patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

Reverse proxy (reverse HTTP proxy) has been used to provide for security and access to legacy applications. Reverse proxies can receive requests from untrusted domains and forward them to locations within a trusted domain. Responses generated within the trusted domain can then be returned by the proxy to the appropriate location within the untrusted domain.

DETAILED DESCRIPTION

Figure 1:
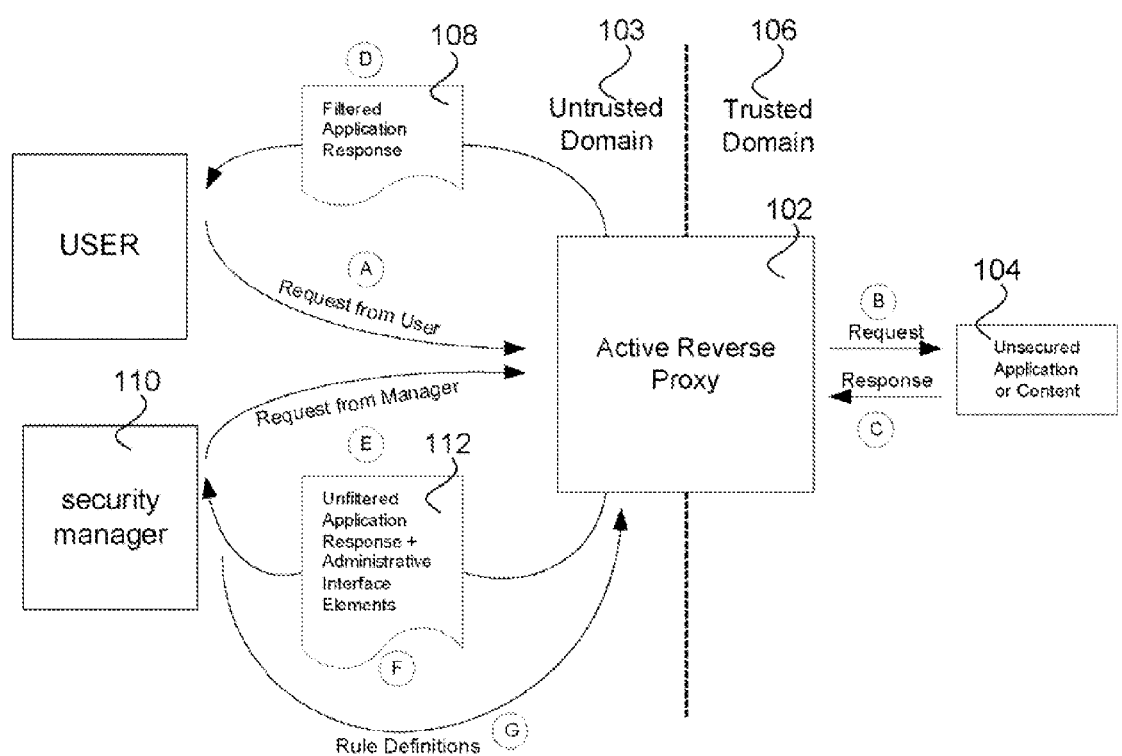
FIG. 1 illustrates an active reverse proxy system of one embodiment.

Embodiments of the present invention concern an active reverse proxy system.

An active reverse proxy system can examine incoming requests and outgoing responses for predefined patterns in the transmitted data and perform transformations on the data to augment or restrict its content and/or affect its presentation. The transformations can be based on a set of rules and scripted logic registered within the active reverse proxy, in combination with knowledge of the identity of the users submitting the requests.

The active reverse proxy can actively modify the presentation of the data, rather than simply refusing access or redirecting the request to a predefined location. The active reverse proxy can operate on OSI protocol layers 6 (presentation) and 7 (application); while existing products operate at level 5 and below.

One embodiment of the present invention is a computer implemented method. The computer implemented method can be implemented as an active reverse proxy system 102. Requests can be received from a user on an untrusted domain 102. These requests can be forwarded to an application 102 on a trusted domain 106. A response, such as a web page, can be received from the application 104. The response can be modified based on rules and the modified response 108 returned to the user.

The modification can include removing or replacing elements, such as text, images or links, from the response. For example, a link to protected content can be replaced by a link to other content so that the user does not notice the missing material.

The rule can be an IF-THEN type rule with trigger and an action. The trigger can include elements of the response or information related to the user. An example of a rule could be IF ((link A is in page) AND (user is in group C)) THEN (replace link A with link B), where "((link A is in page) AND (user is in group C))" is the trigger and "(replace link A with link B)" is the action.

A rules engine in the active reverse proxy can apply a set of stored rules to the responses and do any relevant action.

The active reverse proxy system can allow a security manager to produce the modification rules for the response. In one embodiment, a request is received from a security manager 110. The request can be forwarded to an application. A response from the application can be received and an interface can be inserted in the response 112 to define modification rules for the content of the response. The response 112 with the interface can then be sent to the security manager.

The interface can allow the security manager 110 to select the modification rules. For example, security managers can select an element, such as test, an image or a link, and associate the element with an action and any additional trigger elements. Pull down lists, wizards or other functionality can be used to create the interface.

In one embodiment, to establish security rules for an application protected by the active reverse proxy, a Security Manager can access the application by issuing an HTTP request for a particular URL (E). This request can be received by the active reverse proxy and forwarded to the application (B). The application can respond with an HTML or XML document containing a combination of data, page layout elements and JavaScript code (C). The active reverse proxy can receive the response and notes that the original request came from the Security Manager. The active reverse proxy can modify the response to include additional user interface elements for use by the Security Manager and pass it on to the Security manager's web browser (F). The Security Manager can use the additional interface elements to define access rules for the content. For example, the security manager can indicate that portions of the document not be presented to certain users, modify the contents of pop-up lists, or disable from submissions. The Security Manager can then add the access rules to the active reverse proxy's rules base for use during future request and response processing (G), where they can be triggered by specific patterns within the data.

Users accessing an application protected by the active reverse proxy can be subject to any applicable rules defined by the Security manager. The User can submit a request through the reverse proxy (A), which performs transformations specified by its rule base and passes the transformed request to the application (B). The application can respond through the proxy (C), where additional transformations can be performed before the response is returned to the User (D). The User can then view and interacts with the modified output of the application. Since the User is not a Security Manager, the administrative interface elements are not included in the response, and the User cannot modify access rules within the active reverse proxy.

Access rules maintained within the active reverse proxy can combine a trigger and an action. The trigger can scan incoming request or responses for patterns within the data. A trigger can be a regular expression, XPath expression, XQuery expression, or a programmatic filter written in a scripting language. When a trigger matches a pattern, its corresponding action can be invoked. The actions can employ direct text substitution, or context-sensitive rule-based rewriting of the HTML or XML content to effect the required changes. As outlined above, these rules can be defined interactively as the Security manager views the content against which the rules should apply. These rules can be written to a persistent storage location as they are created and modified. Rules an also be added to the active reverse proxy's rule based by modifying the scripts in the persistent store and requesting that the proxy reload it rule base.

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user, or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A method comprising:
receiving, by a computer system, a first request for content from a security manager;
forwarding, by the computer system, the first request to an application;
receiving, by the computer system, a first response including the content from the application;
inserting, by the computer system, one or more administrative user interface elements into the first response, the one or more administrative user interface elements being operable by the security manager to define access rules for the content;
transmitting, by the computer system, the first response including the content and the one or more administrative user interface elements to the security manager;
receiving, by the computer system from the security manager, an access rule for the content, the access rule being based on a manipulation of at least one of the one or more administrative user interface elements; and
storing, by the computer system, the access rule in a rule base.

2. The method of claim 1 further comprising:
receiving, by the computer system, a second request for the content from a user;
forwarding, by the computer system, the second request to the application;
receiving, by the computer system, a second response including the content from the application;
modifying, by the computer system, the second response based on the access rule stored in the rule base; and
transmitting, by the computer system, the modified second response to the user.

3. The method of claim 2, wherein the modifying includes removing elements from the second response.

4. The method of claim 2, wherein the modifying includes replacing elements in the second response.

5. The method of claim 2, wherein the first and second responses are web pages.

6. The method of claim 2 wherein the access rule comprises a trigger and an action, and wherein the trigger includes information related to an identity of the user.

7. The method of claim 6, wherein the trigger includes an element of the second response.

8. A non-transitory computer readable medium having stored thereon program code executable by a computer system, the program code comprising:
code that causes the computer system to receive a first request for content from a security manager;
code that causes the computer system to forward the first request to an application;
code that causes the computer system to receive a first response including the content from the application;
code that causes the computer system to insert one or more administrative user interface elements into the first response, the one or more administrative user interface elements being operable by the security manager to define access rules for the content;

code that causes the computer system to transmit the first response including the content and the one or more administrative user interface elements to the security manager;

code that causes the computer system to receive from the security manager an access rule for the content, the access rule being based on a manipulation of at least one of the one or more administrative user interface elements; and code that causes the computer system to store the access rule in a rule base.

9. The non-transitory computer readable medium of claim 8 wherein the program code further comprises:

code that causes the computer system to receive a second request for the content from a user;

code that causes the computer system to forward the second request to the application;

code that causes the computer system to receive a second response including the content from the application;

code that causes the computer system to modify the second response based on the access rule stored in the rule base; and code that causes the computer system to transmit the modified second response to the user.

10. The non-transitory computer readable medium of claim 9, wherein the modification includes removing elements from the second response.

11. The non-transitory computer readable medium of claim 9, wherein the modification includes replacing elements in the second response.

12. The non-transitory computer readable medium of claim 9, wherein the first and second responses are web pages.

13. The non-transitory computer readable medium of claim 9 wherein the access rule comprises a trigger and an action, and wherein the trigger includes information related to an identity of the user.

14. The non-transitory computer readable medium of claim 13, wherein the trigger includes elements of the second response.

15. A system comprising:

a processing component configured to:

receive a first request for content from a security manager;

forward the first request to an application;

receive a first response including the content from the application;

insert one or more administrative user interface elements into the first response, the one or more administrative user interface elements being operable by the security manager to define access rules for the content;

transmit the first response including the content and the one or more administrative user interface elements to the security manager;

receive from the security manager an access rule for the content, the access rule being based on a manipulation of at least one of the one or more administrative user interface elements; and store the access rule in a rule base.

16. The system of claim 15 wherein the processing component is further configured to:

receive a second request for the content from a user;

forward the second request to the application;

receive a second response including the content from the application;

modify the second response based on the access rule stored in the rule base; and transmit the modified second response to the user.

17. The system of claim 16, wherein the modifying includes removing elements from the second response.

18. The system of claim 16, wherein the modifying includes replacing elements in the second response.

19. The system of claim 16, wherein the access rule is an IF-THEN type rule with a trigger and an action.

20. The system of claim 19, wherein the trigger includes an element in the second response.

21. The system of claim 19, wherein the trigger includes information related to an identity of the user.

* * * * *

UNITED STATES PATENT AND TRADEMARK OFFICE
CERTIFICATE OF CORRECTION

| | | |
|---|---|---|
| PATENT NO. | : 8,079,075 B2 | Page 1 of 1 |
| APPLICATION NO. | : 11/467251 | |
| DATED | : December 13, 2011 | |
| INVENTOR(S) | : Krasnoiarov et al. | |

It is certified that error appears in the above-identified patent and that said Letters Patent is hereby corrected as shown below:

On Title page, in column 2, under "Attorney, Agent or Firm", line 1, delete "Filpatrick" and insert -- Kilpatrick --, therefor.

In column 1, line 5, delete "his" and insert -- this --, therefor.

In column 2, line 14, delete "test," and insert -- text, --, therefor.

In column 2, line 65, delete "an" and insert -- can --, therefor.

In column 2, line 67, delete "it" and insert -- its --, therefor.

Signed and Sealed this
Thirteenth Day of March, 2012

David J. Kappos
*Director of the United States Patent and Trademark Office*